(12) United States Patent
Orlik et al.

(10) Patent No.: US 7,023,912 B2
(45) Date of Patent: Apr. 4, 2006

(54) HYBRID ADAPTIVE EQUALIZER FOR OPTICAL COMMUNICATIONS SYSTEMS

(75) Inventors: Philip Orlik, Scotch Plains, NJ (US); Jinyun Zhang, New Providence, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 743 days.

(21) Appl. No.: 10/223,116

(22) Filed: Aug. 19, 2002

(65) Prior Publication Data

US 2004/0032904 A1  Feb. 19, 2004

(51) Int. Cl.
*H04H 7/30* (2006.01)

(52) U.S. Cl. .............. 375/232; 375/233; 708/323

(58) Field of Classification Search ........... 375/131, 375/216, 229, 232, 233, 243, 254, 28 R, 375/349; 370/498, 517; 708/300, 301, 322, 708/323; 333/18
See application file for complete search history.

(56) References Cited

U.S. PATENT DOCUMENTS 3,931,604 A * 1/1976 Treynor .............. 333/18
4,417,317 A * 11/1983 White et al. ............ 708/819

(Continued)

FOREIGN PATENT DOCUMENTS

EP 0 455 910 A2 11/1991

OTHER PUBLICATIONS

Winters, J.H. et al., "Electrical Signal Processing Techniques in Long-Haul Fiber-Optic Systems," IEEE Transactions on Communications, vol. 38, No. 9, Sep. 1990.

(Continued)

*Primary Examiner*—Tesfaldet Bocure
*Assistant Examiner*—Naheed Ejaz
(74) *Attorney, Agent, or Firm*—Dirk Brinkman; Andrew J. Curtin

(57) ABSTRACT

A method equalizes a received signal in an optical communications system. The received signal is passed through an analog delay line where it is tapped to generate a set of delayed copies of the received signal. In a set of analog multipliers, each delayed copy of the received signal is multiplied by a corresponding weight to generate a set of weighted signals that are then summed to produce an output signal. The output signal is thresholded and subtracted from the output signal to produce an error signal, which is periodically sampled. In a digital weight updating circuit, the weights are produced from digitized versions of the sampled error signal and samples of the delayed copies of the received signal.

7 Claims, 4 Drawing Sheets

U.S. PATENT DOCUMENTS

| | | | |
|---|---|---|---|
| 4,536,887 A * | 8/1985 | Kaneda et al. | 381/92 |
| 5,272,663 A * | 12/1993 | Jones et al. | 708/819 |
| 5,392,042 A * | 2/1995 | Pellon | 341/143 |
| 5,416,799 A * | 5/1995 | Currivan et al. | 375/232 |
| 5,586,144 A * | 12/1996 | Kahlman et al. | 375/229 |
| 5,650,954 A * | 7/1997 | Minuhin | 708/819 |
| 5,734,680 A * | 3/1998 | Moore et al. | 375/263 |
| 5,956,333 A * | 9/1999 | Zhou et al. | 375/152 |
| 6,016,374 A | 1/2000 | Adams et al. | 385/24 |
| 6,067,180 A | 5/2000 | Roberts | 358/181 |
| 6,169,771 B1 * | 1/2001 | Shou et al. | 375/343 |
| 6,256,342 B1 | 7/2001 | Schlag et al. | 375/229 |
| 6,411,417 B1 | 6/2002 | Roberts et al. | 359/161 |
| 6,744,330 B1 * | 6/2004 | Jones et al. | 333/28 R |
| 2001/0040922 A1 | 11/2001 | Buchali et al. | 375/233 |
| 2002/0101982 A1* | 8/2002 | Elabd | 379/406.01 |

OTHER PUBLICATIONS

Kasturia, S. et al., "Techniques for High-Speed Implementation of Nonlinear Cancellation," IEEE Journal on Selected Areas in Communications, vol. 9, No. 5, Jun. 1991.

* cited by examiner

HYBRID ADAPTIVE EQUALIZER FOR OPTICAL COMMUNICATIONS SYSTEMS

FIELD OF THE INVENTION

This invention relates generally to the field of optical communications systems, and more particularly to equalizing signals received via an optical channel.

BACKGROUND OF THE INVENTION

FIG. 1 shows an optical communication system 100 that can use the invention. The system 100 includes laser and modulator 110 for converting a bit stream m(t) 101 at a predetermined bit rate to analog pulses of light 102. An optical fiber 120 carries the light pulses to a photo-diode 130 that converts the light pulses back to a signal 103. An amplifier/receiver 140 amplifies and filters the signal 103 to remove wideband noise and to produce a received signal x(t) 104. The bit stream is sampled at the bit rate. The samples are compared with a sampling threshold. If a sample of x(t) is greater than the threshold, then it is a one, otherwise it is a zero. This recovers the input bitstream 101.

In practical systems, the received signal 104 is distorted in time and shape leading to a degradation known as inter-symbol interference (ISI) when pulses overlap or otherwise interfere with each other. ISI increases the bit error rate (BER) in the system 100. If the ISI is severe, an equalizer can compensate for the distortion in the received signal x(t) 104. Ideally, it is desired to remove dispersive effects completely, and to recover the original bit stream 101 with a minimal number of errors.

In one possible solution, the receiver 140 reduces the ISI using a compensator, commonly called an equalizer. There are many types of equalizers used in practical digital communication systems, such as maximum-likelihood (ML) estimation based equalizers, linear filtering with adjustable coefficients, decision feedback equalizers (DFE), etc., see Proakis, *Digital Communications,* Fourth Edition, McGraw-Hill, New York, 2001. In order to be used for unknown channels, the equalizers are automatically adjusted to the channel impulse response and time variations in the channel impulse response. This technique is called adaptive equalization.

Adaptive equalizers can be implemented as digital filters that operate on quantized samples of the received electrical signal 104. The difficulty with digital equalization is that the received signal needs to be converted to digital form before it can be filtered, and then the digital signal needs to be sampled and quantized at least once per symbol period.

Optical communication systems can operate at bit rates greater than 10 Giga bits per second. This requires high-speed analog-to-digital converters and very fast digital equalizers, which is problematic.

FIG. 2 shows a typical prior adaptive equalizer 200 that includes a linear finite impulse response (FIR) filter 210 with adjustable weight coefficients, and a decision device 220. An input signal 201 to the equalizer 200 is an ISI distorted version of transmitted signal with noise. The weights are adjusted according to an error signal e(n) 204 produced by an adder 230, which takes as input the signals the output y(n) of the FIR 210 and the input d(n) of the decision device 220.

A variety of techniques have been developing to adaptively adjust the weights of the filter 210 in a manner that minimizes the distortion. One commonly used error metric is a peak distortion error. This is the well-known zero-forcing equalizer described by Proakis. Although this error metric reduces ISI, it significantly increases noise.

To alleviate the increase in noise, a metric based on the mean-square error (MSE) can be used. In this case, the error metric is defined as $E[d(t)-y(t)^2]$ The operator $E[\ ]$ is the expectation operator, d(t) is the desired response of the equalizer 210, and y(t) is the actual response seen at the output of the FIR filter 210. A least-mean squares error (LMS) can be used to determine the filter parameters that minimize the MSE. For an LMS-type equalizer, the tap weight coefficients of the equalizer are adjusted recursively by the following:

$$w_i(n+1) = w_i(n) + \mu e(n) \cdot x_i(n) \quad i=1, \ldots, N, \quad (1)$$

where N is the equalizer length, $w=[w_0, w_1, \ldots w_N]$, is a tap weight vector of length N, n is a time index, $\mu$ is a step size parameters that controls the rate of convergence, e(n) is the error signal 204, and $x_i$ is a delayed version of the input signal 201. The error signal 204 is defined by $$e(n) = d(n) - y(n), \quad (2)$$

where y(n) is the output signal 202 of the adaptive equalizer and d(n) is the output of the decision device.

In general, the output of the decision device 220 can be one of many complex levels. Most optical communications systems use a simple two level amplitude shift keying technique, known as on-off keying. In that case, the output of the decision device is one of two levels, a high level representing a one bit or a low level representing a zero bit. However, because optical communication systems can operate at bit rates greater than 10 Giga bits per second high-speed analog-to-digital converters and very fast digital equalizers are problematic.

SUMMARY OF THE INVENTION

The invention provides a method and apparatus for reducing inter-symbol interference in data transmitted by an optical communication system. The ISI is reduced by a hybrid adaptive equalizer. The equalizer includes an analog delay line with taps, and a set of digitally controlled multipliers to adjust the taps. The weights are determined with digital circuitry. Additionally, the equalizer operates on the received signal after conversion to the electrical domain. This eliminates the need for expensive optical compensators.

The weights are adapted to minimize a mean-square error (MSE) between an output of the equalizer and voltage values that represent either a one bit or a zero bit. An error signal is generated by subtracting the output of the equalizer from the output of a decision device. This is equivalent to operating the equalizer in a decision directed mode where bit decisions are used to generate an error signal.

The invention also provides a method for generating a sign, either positive or negative, from the signal at the output of each delay element. By only using the sign, the complexity of the equalizer is greatly reduced. The error signal and the signs are then used to update the weights for the taps. Because the optical channel varies slowly in time, the weight can be updated infrequently, for example, at a rate that is much slower than the bit rate of the system.

More particularly, a method equalizes a received signal in an optical communications system. The received signal is passed through an analog delay line where it is tapped to generate a set of delayed copies of the received signal. In a set of analog multipliers, each delayed copy of the received signal is multiplied by a corresponding weight to generate a set of weighted signals that are then summed to produce an output signal.

The output signal is thresholded and subtracted from the output signal to produce an error signal, which is periodically sampled. In a digital weight updating circuit, the weights are produced from digitized versions of the sampled error signal and samples of the delayed copies of the received signal.

DETAILED DESCRIPTION OF THE PREFERRED EMBODIMENT

System Structure

Figure 3:
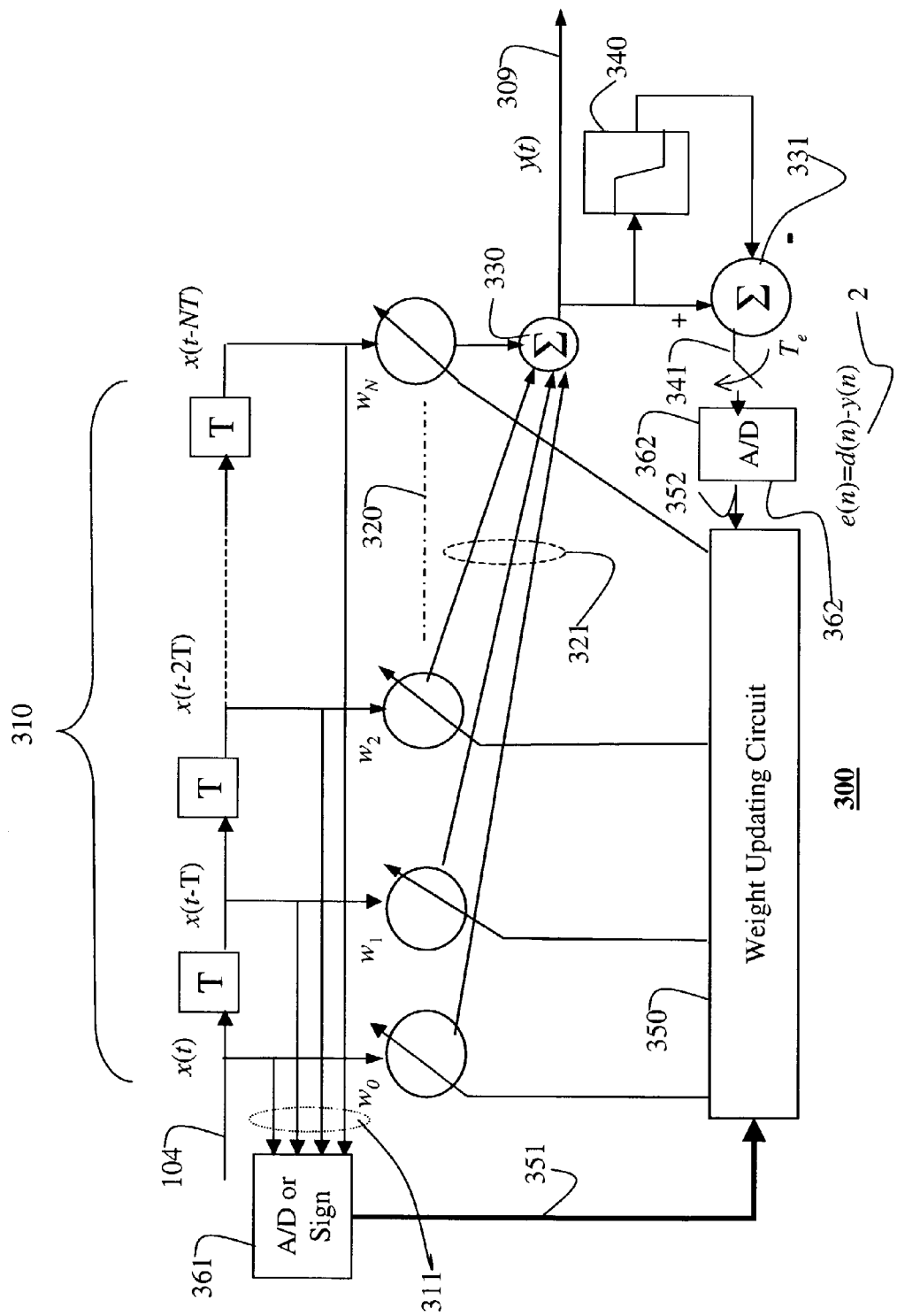
FIG. 3 is a block diagram of a hybrid adaptive equalizer according to the invention.

FIG. 3 shows a hybrid adaptive equalizer 300 according to the invention that includes both analog and digital components. The analog components of the equalizer 300 includes of a series of N analog tapped delay elements 310, a set of N+1 analog multipliers 320, two analog adders 330–331, and an analog decision device 340, e.g. a comparator. These analog components implement an analog tapped delay line filter.

The digital components include a weight updating circuit 350 used to adjust the weights w of the set of tap. The weights can be adjusted according to the least mean-square (LMS) error, a signed LMS error, or a recursive least-squares error, see Proakis, *Digital Communications*, Fourth Edition, McGraw-Hill, New York, 2001 for other variations. Inputs to the weight updating circuit 350 pass through analog-to-digital (A/D) converters 361–362.

System Operation

Figure 1:
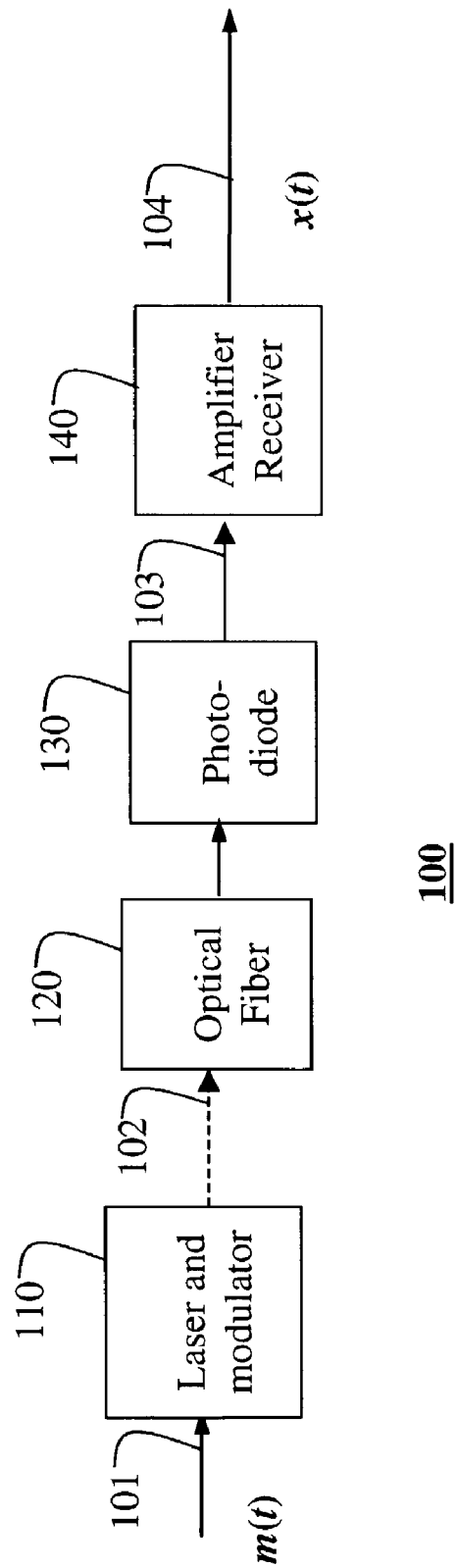
FIG. 1 is a block diagram of an optical communication system that uses the invention.
Figure 2:
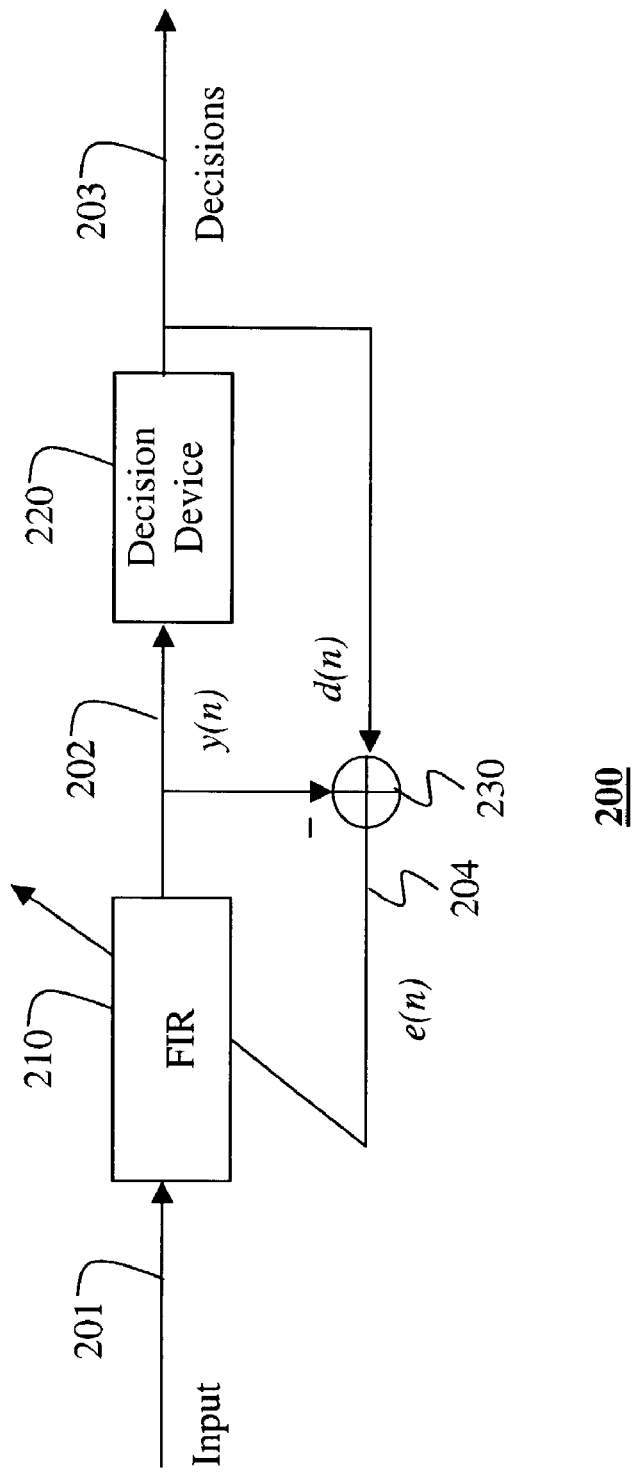
FIG. 2 is a block diagram of a prior art adaptive equalizer.

The input to the hybrid adaptive equalizer is the received signal x(t) 104 shown in FIG. 1, specifically an electrical analog output of the amplifier/receiver 140. This signal is passed through the series of N analog tapped delay elements 310, each delay element introduces a delay of T seconds. Typically, T is selected to be equal to the symbol period of the transmitted bit stream.

The delay-line 310 produces N delayed versions of the input signal denoted x(t–T), x(t–2T), . . . , x(t–NT). Each delayed signal, along with the original signal x(t), is passed through one of the N+1 corresponding analog multiplier 330, which are scaled by weight $w_0, \ldots, w_N$. The weights are determined so as to minimizes the MSE between the filter output y(t) 309, and the one and zero levels. The outputs 321 of the N+1 multipliers 320 are summed 330 to produce an equalizer output y(t) 309.

To adapt the weights used in the tapped delay line, two properties of the optical communication systems 100 are considered. First, the pulses vary slowly over time. That is, the transmitter 110, optical fiber 120, photodiode 130 and receiver 140 have time varying impulse response, but the impulse response can be considered fixed when compared to the symbol rate, see Agrawal, *Fiber-Optic Communication Systems*, Second Edition, Wiley & Sons, Inc., 1997.

Because the optical channel is slowly varying, the rate at which the taps need to be updated can be reduced well below the bit rate without significantly impacting performance. Second, most optical systems are designed to operate at bit error rates (BER) less than $10^{-12}$. Thus, the received signal does not differ greatly from mean one and zero levels. Therefore, the equalizer can be operated in a decision directed mode, which eliminates the need for a training sequence.

In the decision directed mode, the summed output y(t) 309 is sent periodically through the comparator 340 where the output 309 signal is compared to a threshold, and one of two levels are generated. For example, a first (positive) voltage level +V is generated if y(t) is greater than the threshold, and otherwise, a second (negative) voltage level is –V generated.

An output of the decision device 340 is subtracted 331 from the output signal y(t) 309 to generated an error signal e 341 according to equation 2, above. The error signal is periodically sampled with a period $T_e$, where $T_e$ is much greater than the symbol period T. Because of the slow varying channel, the sampling period can be larger than one hundred times (two orders of magnitude) the symbol period.

A digitized sampled error signal 352 forms one input for the computation of the new tap weights. The other input 351 is a digitized version of the delayed tap signals x(t), x(t–T), x(t–2T), . . . , x(t–NT), according to equation 1. These are sampled concurrently with the sampled error signal 352. In one approach, the signals are quantized samples, i.e., the signals pass through the A/D converters 361–362. In a simpler solution, only the sign (one bit) of each signals is used.

With the two digital inputs 351–352, equation 1 can be evaluated in circuit 350 to determine the vector of tap weights w. The circuit 350 can be a micro controller or ASIC. The new weights are then applied to the multipliers 320 of the tapped delay-line filter.

Figure 4B:
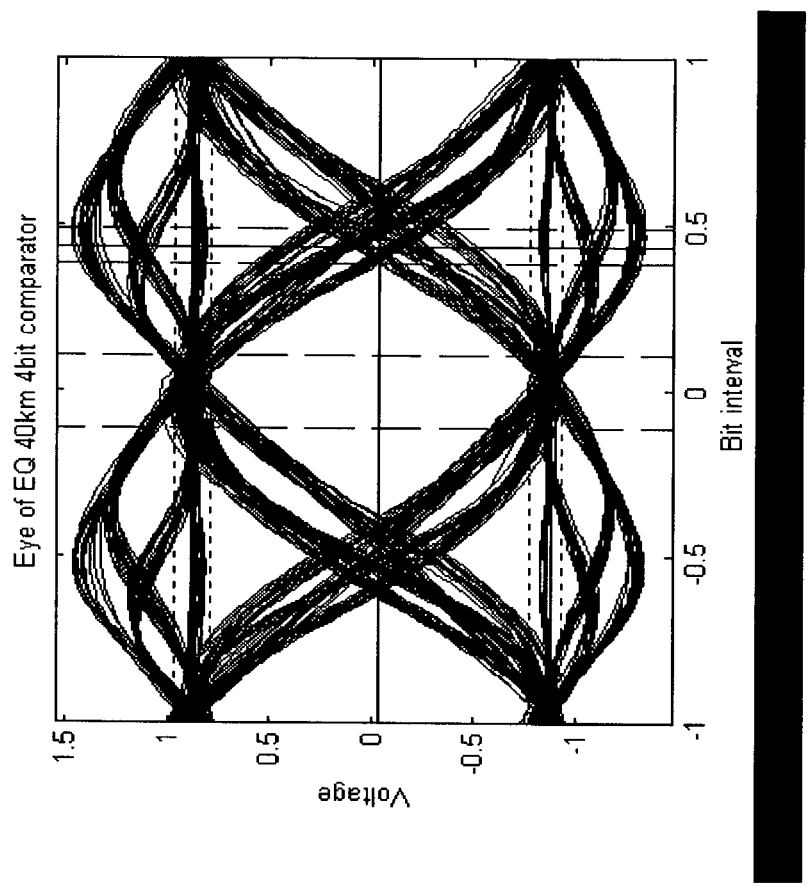
FIGS. 4A and 4B are eye diagrams of unequalized and equalized signal.
Figure 4A:
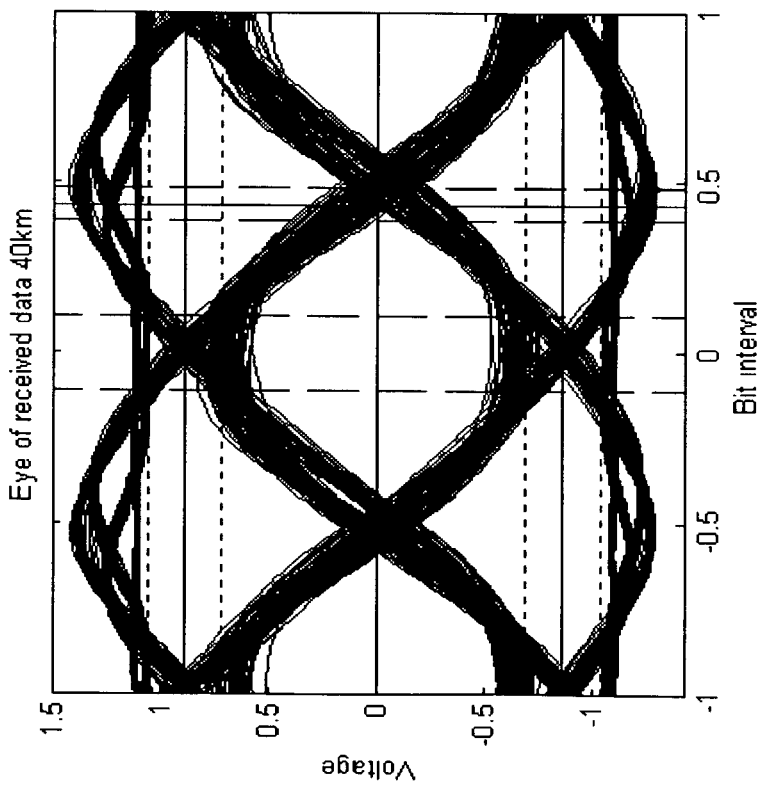

FIGS. 4A and 4B compare an unequalized signal with a signal equalized according to the invention. The waveforms are displayed as eye-diagrams. The symbol period is $T=10^{-10}$ seconds, which corresponds to a bit rate of 10 Giga bps. The BER for the unequalized signal in FIG. 4A is $3.205\ e^{-004}$, while for the equalized waveform the BER is estimated to be $7.2982\ e^{-010}$, an improvement of five orders of magnitude.

Effect of the Invention

The hybrid adaptive equalizer according to the invention reduces ISI caused by optical as well as electrical components. The equalizer can operate at data rates greater than 10 Giga bps by using an analog tapped-delay line to implement the filter, and digital methods to adapt the weights applied to analog taps. The method can be applied to any optical systems subject to ISI, such as multi-mode fiber (MMF) systems, and single mode fiber (SMF) systems.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for equalizing a received signal in an optical communications system, comprising:

passing the received signal through an analog delay line;

tapping the analog delay line to generate a set of delayed copies of the received signal;

multiplying, in a set of analog multipliers, each delayed copy of the received signal by a corresponding weight of a set of weights to generate a set of weighted signals;

summing the weighted signals to produce an output signal;

thresholding the output signal;

subtracting the thresholded output signal from the output signal to produce an error signal;

periodically sampling the error signal and the delayed copies of the received signal; and determining, in a digital weight updating circuit, the set of weights from digitized versions of the sampled error signal and the delayed copies of the received signal.

2. The method of claim 1 wherein the digitized version of the delayed copies of received signal are sign bits.

3. The method of claim 1 wherein a rate of sampling is substantially less than a bit rate of the received signal.

4. The method of claim 3 wherein the rate of sampling is two orders of magnitude less than the bit rate of the received signal.

5. The method of claim 1 wherein the analog delay line includes N tapped delay elements.

6. The method of claim 1 wherein the weights are adjusted according to a least mean-square error.

7. A system for equalizing a received signal in an optical communications system, comprising:

an analog delay line connected to the received signal;

taps to generate a set of delayed copies of the received signal;

a set of analog multipliers, each multiplier generating a weighted signal;

an adder summing the weighted signals to produce an output signal;

a comparator thresholding the output signal;

means for subtracting the thresholded output signal from the output signal to produce an error signal;

means for periodically sampling the error signal and the delayed copies of the received signal; and a weight updating circuit determining the weights for the multipliers from digitized versions of the sampled error signal and the delayed copies of the received signal.

* * * * *